United States Patent
Hanley et al.

(10) Patent No.: US 6,935,882 B2
(45) Date of Patent: Aug. 30, 2005

(54) PLUGGABLE OPTICAL TRANSCEIVER LATCH

(75) Inventors: Michael Francis Hanley, Rochester, MN (US); Gerald Daniel Malagrino Jr., Rochester, MN (US)

(73) Assignee: JDS Uniphase Corporation, San Jose, CA (US)

(*) Notice: Subject to any disclaimer, the term of this patent is extended or adjusted under 35 U.S.C. 154(b) by 47 days.

(21) Appl. No.: 10/452,852

(22) Filed: Jun. 2, 2003

(65) Prior Publication Data

US 2003/0236019 A1 Dec. 25, 2003

Related U.S. Application Data (60) Provisional application No. 60/453,654, filed on Mar. 11, 2003, provisional application No. 60/405,718, filed on Aug. 26, 2002, provisional application No. 60/392,353, filed on Jul. 1, 2002, and provisional application No. 60/390,147, filed on Jun. 21, 2002.

(51) Int. Cl.$^7$ ............................................. H01R 33/945
(52) U.S. Cl. ......................... 439/372; 439/577; 385/88; 385/89
(58) Field of Search .................. 385/88–92; 439/372, 439/577, 352; 361/785, 752

(56) References Cited

U.S. PATENT DOCUMENTS

| | | | |
|---|---|---|---|
| 5,901,263 A | 5/1999 | Gaio et al. ................... 385/92 |
| 6,287,128 B1 | 9/2001 | Jones et al. ................. 439/76.1 |
| 6,439,918 B1 | 8/2002 | Togami et al. ............... 439/372 |
| 6,494,623 B1 * | 12/2002 | Ahrens et al. ................ 385/76 |
| 6,533,603 B1 * | 3/2003 | Togami ....................... 439/372 |
| 6,588,947 B2 * | 7/2003 | Mine et al. .................... 385/92 |

* cited by examiner

Primary Examiner—Gary Paumen
(74) Attorney, Agent, or Firm—Allen, Dyer, Doppelt, Milbrath & Gilchrist, P.A.

(57) ABSTRACT

The invention relates to a latch device for a pluggable opto-electronic module, such as an optical transceiver, for locking the module in a rail or cage system of a host machine. The latest generation of optical transceivers include all metal housings, instead of all plastic or partial plastic, to ensure adequate heat dissipation. The relatively heavier housings necessitate the use of more robust latch devices. The latch device according to the present invention includes a sliding element with arms extending therefrom for pivoting a latching hook out of engagement with the rail or cage system. In a preferred embodiment, a pair of latching hooks are provided, one on each side of the module. The latching hooks are mounted on the ends of spring arms, which extend from the same sheet of spring metal positioned across the bottom of the housing.

20 Claims, 10 Drawing Sheets

PLUGGABLE OPTICAL TRANSCEIVER LATCH

CROSS-REFERENCE TO RELATED APPLICATIONS

The present invention claims priority from U.S. patent applications Ser. Nos. 60/390,147 filed Jun. 21, 2002; 60/392,353 filed Jul. 1, 2002; 60/405,718 filed Aug. 26, 2002; and 60/453,654 filed Mar. 11, 2003.

TECHNICAL FIELD

The present invention relates to a latch for a pluggable optical transceiver, and in particular to a latch for facilitating removal of the transceiver from a guide rail or cage of a host device.

BACKGROUND OF THE INVENTION

Conventional optical transceivers include a transmitter optical subassembly (TOSA) and a receiver optical subassembly (ROSA) connected to a printed circuit board for transmitting and receiving optical signals, respectively, between an optical network and a host device. A "hot pluggable" optical transceiver includes an electronic connector electrically connected to the printed circuit board for mating with a corresponding optical coupler mounted on a printed circuit board in the host device. A cage or a rail system is provided on the host device's printed circuit board to facilitate the mating of the optical connector with the optical coupler. A latch requiring manual actuation is provided to ensure that the transceiver is secure in the cage or rail system. Conventional latch devices are disclosed in U.S. Pat. No. 5,901,263 issued May 4, 1999 in the name of Gaio et al; U.S. Pat. No. 6,287,128 issued Sep. 11, 2001 in the name of Jones et al; and U.S. Pat. No. 6,439,918 issued Aug. 27, 2002 in the name of Togami et al.

Unfortunately, all of the conventional latch devices were developed for relatively small, lightweight modules, and therefore not sufficiently robust for heavier modules. The latest 10GB optical transceivers have large metallic heat sinks extending from housings, which are made entirely of metal. Accordingly, any latch device for the newer transceivers needs to be considerably more robust to repeatedly engage and disengage the guide rail or cage, as well as support the entire module during removal. Moreover, conventional transceivers are mounted almost flush with a front face of the host device leaving very little of the module to grasp, while leaving gaps resulting in electro-magnetic interference (EMI) leakage.

An object of the present invention is to overcome the shortcomings of the prior art by providing a robust latch device for an optical transceiver that is effective for use with larger and heavier modules.

Another object of the present invention is to provide an improved housing front end design, which reduces EMI and is easily grasped for removal.

SUMMARY OF THE INVENTION

Accordingly, the present invention relates to an optical transceiver module for insertion into an electrical coupler mounted in a guide rail or cage of a host device comprising:

a first optical sub-assembly for converting optical signals into electrical signals or electrical signals into optical signals;

a printed circuit board electrically connected to the optical sub-assembly including circuitry for controlling the optical sub-assembly;

a housing for supporting the optical sub-assembly and the printed circuit board therein;

an electrical connector extending from a first end of the housing electrically connected to the printed circuit board for mating with the electrical coupler mounted in the host device;

an optical couple extending outwardly from the second end of the housing for receiving an optical connector on the end of an optical fiber;

a reciprocating slide extending at least partially around the optical coupler moveable between a latch position and an unlatch position;

a first arm extending from the slide into the housing;

a first lever pivotally mounted to the housing;

a first latch hook extending outwardly from the first lever for contacting a first latching surface on the guide rail or cage for locking the module in position; and a first camming surface on the first lever for engaging the first arm when the slide is in the unlatch position, thereby pivoting the first latch hook out of engagement with the first latching surface enabling removal of the module from the host device.

Another aspect of the present invention relates to an optical transceiver module insertable along an insertion direction into an electrical coupler of a cage or rail system in a host device, which includes a front bezel, comprising:

a transmission optical sub-assembly for converting electrical signals into optical signals;

a receiver optical sub-assembly for converting optical signals into electrical signals;

a printed circuit board electrically connected to the transmission and receiver optical sub-assemblies including circuitry for controlling the transmission and receiver optical sub-assemblies;

a housing for supporting the transmission and receiver optical sub-assemblies and the printed circuit board therein;

an electrical connector extending from a first end of the housing electrically connected to the printed circuit board for mating with the electrical coupler mounted in the host device;

a flange extending outwardly from around a second end of the housing for abutting the front bezel of the host device, said flange defining a first frontal area;

a duplex optical coupler extending outwardly from the second end of the housing for receiving a pair of optical connectors on the ends of a pair of optical fibers, said optical coupler defining a second frontal area, which is less than said first frontal area; and a shoulder extending from opposite sides of the optical coupler for manually gripping the module to facilitate removal thereof from the host device.

BRIEF DESCRIPTION OF THE DRAWINGS

The invention will be described in greater detail with reference to the accompanying drawings which represent preferred embodiments thereof, wherein.

DETAILED DESCRIPTION

With reference to FIGS. 1, 2, 3 and 4, the pluggable optical transceiver 1 according to the present invention includes a module housing 2, which supports a ROSA 3, a TOSA 4, and a printed circuit board 6. The housing 2 is comprised of a base 7 and a heat-dissipating cover 8, which includes a plurality of heat sink fins 9. A plurality of lands 11 extend from the base 7 for supporting the printed circuit board 6. A flange 12 is provided on the cover 8 for abutting a front face plate disposed on the host device, when the module is inserted therein. The flange 12 has dimensions that are taller and wider than those of the remainder of the housing 2 to provide a shield against electro-magnetic interference (EMI). A gasket 13 is wrapped around the housing 2 between the flange 12 and the host device face plate to further limit the passage of EMI. The gasket 13 can be either a foam conductive strip or a plurality of spring fingers. A snout 14, extending from the flange 12, is formed by a top portion 16 extending from the cover 8 and a bottom portion extending from the base 7. The snout 14 forms an optical coupler for receiving optical connectors provided on the ends of optical fibers, which transmit optical, signals to and from the optical network. Threaded fasteners 18 are used to fix the base 7 to the cover 8. The sides of the base 7 and cover 8 overlap to ensure proper alignment and to limit the amount of EMI, i.e. any EMI must follow a circuitous route to pass through the joint therebetween.

Figure 1:
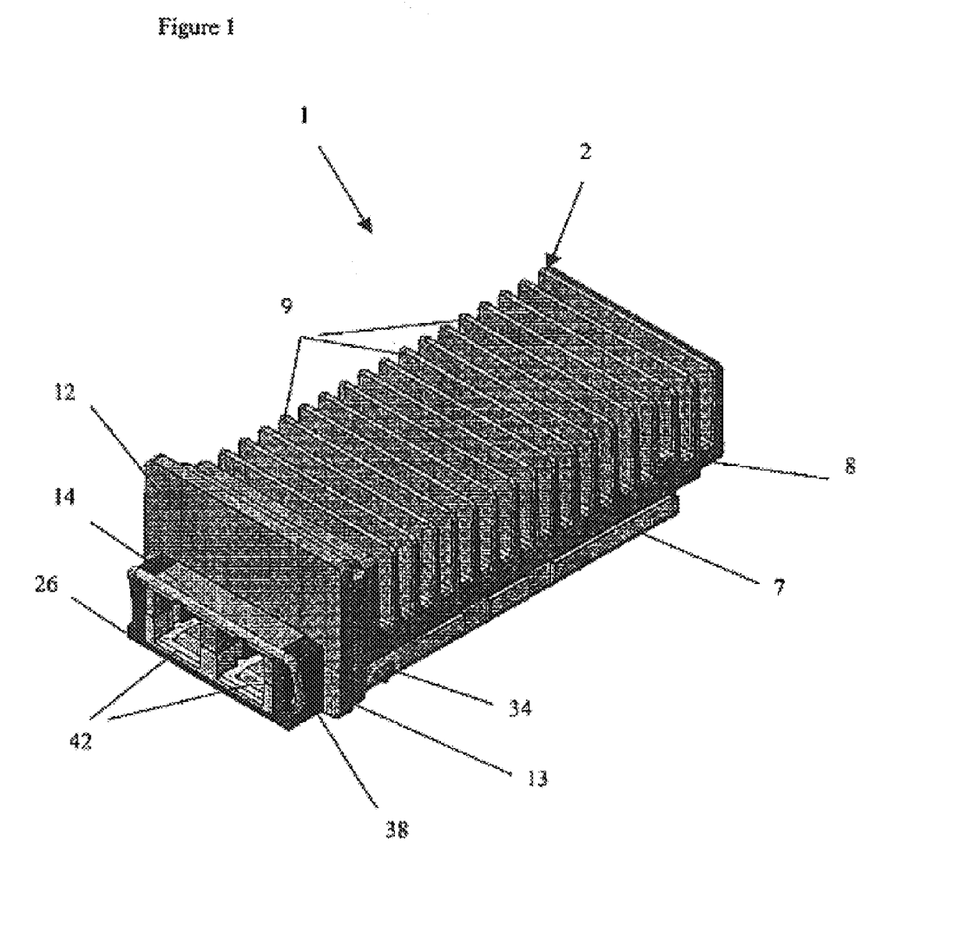
FIG. 1 is an isometric view of an opto-electronic transceiver according to the present invention.
Figure 2:
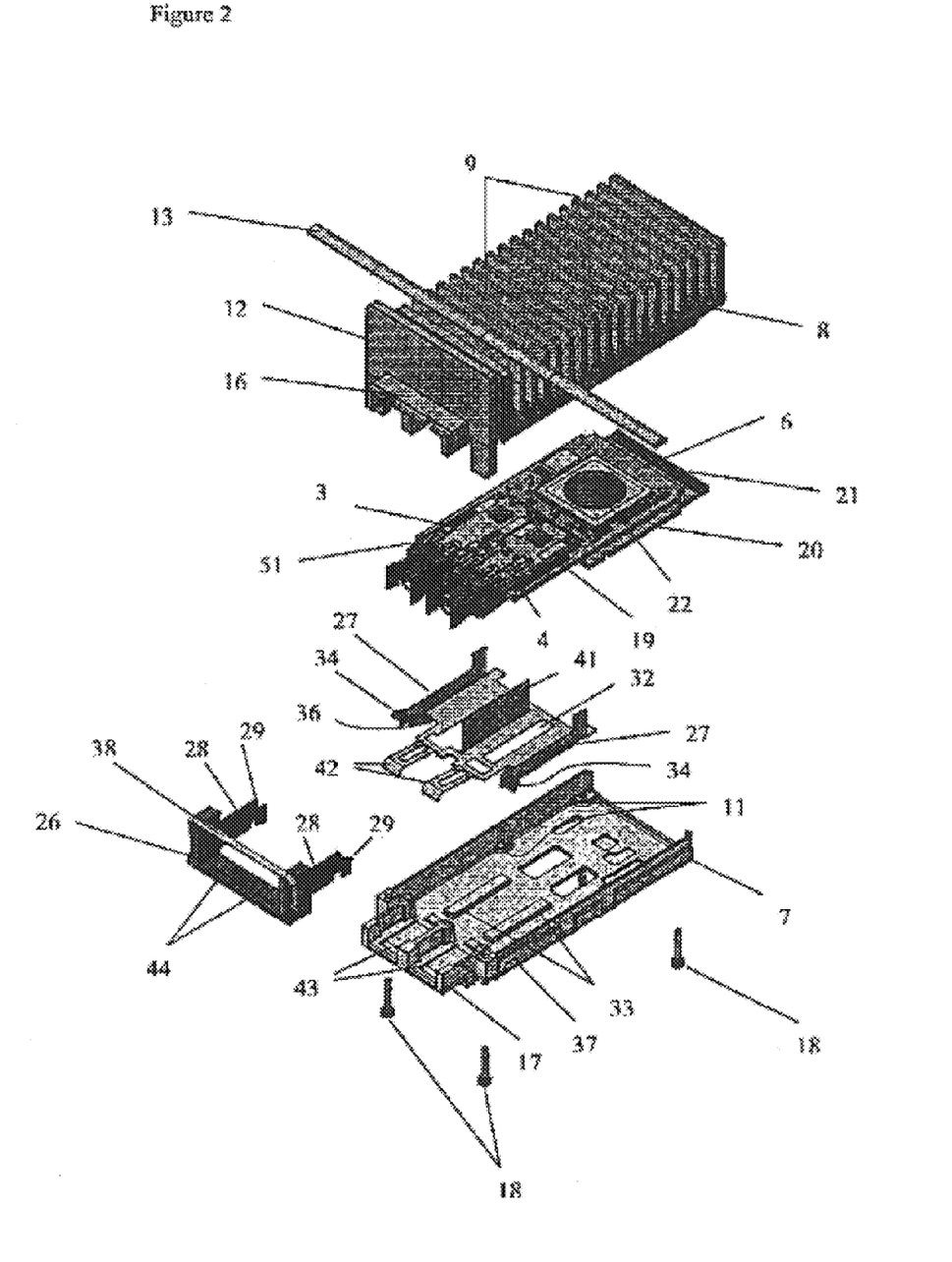
FIG. 2 is an exploded view of the transceiver of FIG. 1.

The ROSA 3 and the TOSA 4 are electrically connected to the printed circuit board 6 via a plurality of leads 19 extending from the side and rear of each of the optical subassemblies 3 and 4. To increase the amount of available space, the printed circuit board 6 includes a daughter board 20 electrically connected to the main board 6. An electrical connector 21, in the form of a card edge connector from the daughter board 20, extends from the rear end of the transceiver housing 2 for electrically connecting the transceiver 1 to a corresponding electrical coupler found at an inner end of the rail or cage system of the lost device. Compressible, non-conductive thermal pads are positioned between the cover 8 and any major heat generating elements, e.g. the ROSA 3, the TOSA 4 and a serializer/deserializer circuit 22. Additional thermal pads may be placed between the base 7 and the major heat generating elements.

The transceiver 1 is held in the rail or cage system using a latch device comprised of a reciprocating slide 26, which is used to pivot a pair of latching lever arms 27. The slide 26 surrounds the snout 14, at least on three sides, and is slideable thereon between an inner, latched position and an outer, unlatched position. Arms 28 extend from the rear end of the slide 26 into the housing 2 along each side thereof. Fingers 29 are provided at the outer free end of each arm 28, for reasons that will be explained hereinafter. In the preferred embodiment, both of the latching lever arms 27 are leaf springs formed from a single sheet of flexible metal 31, which is mounted in the base 7. To correctly position the sheet 31, elongated slots 32 are cut out of the sheet 31 for receiving raised portions 33 formed in the base 7. Each latching lever arm 27 includes a latch hook 34 for engaging a corresponding latching surface, e.g. an opening, in the guide rail or cage, and a ramped surface 36 providing a camming surface for the fingers 29. The rear surface of the latch hook 34 is beveled to ensure the latch hook 34 is pivoted inwardly by the side wall of the guide rail or cage, while the transceiver 1 is being inserted therein.

Figure 3:
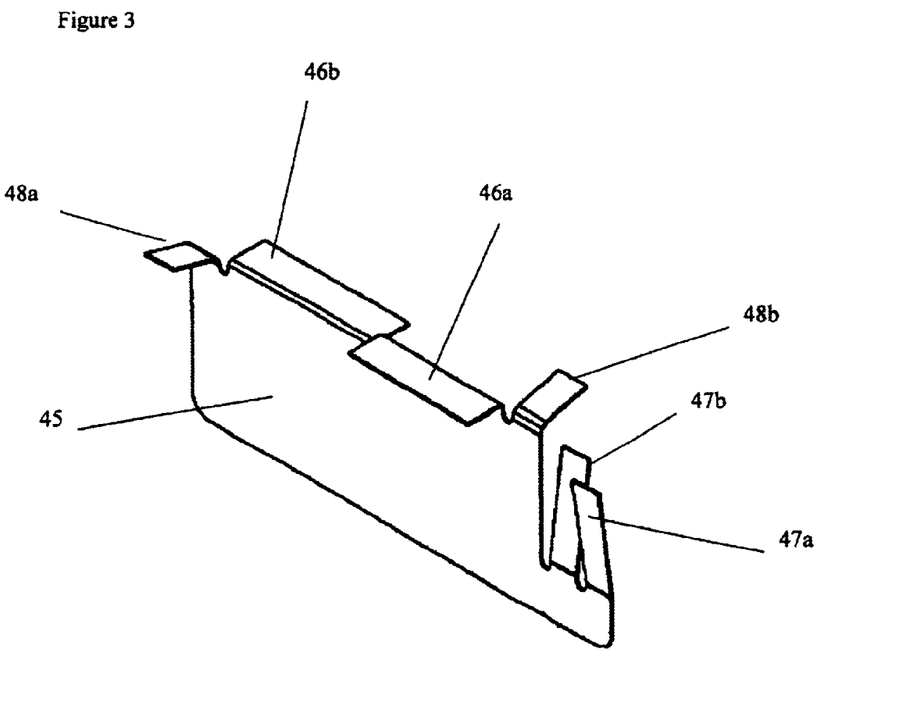
FIG. 3 is an isometric view of an alternative divider shield for the transceiver of FIG. 1 according to the present invention.
Figure 4:
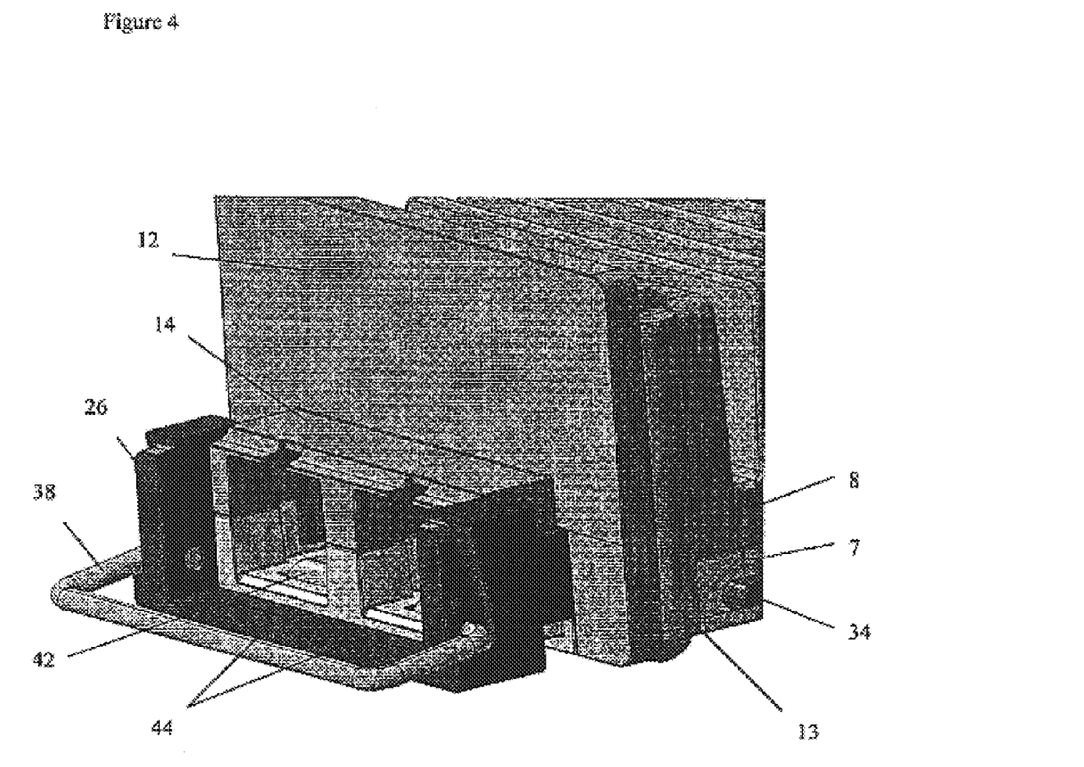
FIG. 4 is an isometric view of the front end of the transceiver of FIG. 1.

In the latched position (FIG. 1), the latch hook 34 is normally spring bias outwardly and extends through a hole 37 in the base 7 for engaging the corresponding hole in the guide rail or cage. To disengage the transceiver 1 from the guide rail or cage, the slide 26 is pulled in the direction of the transceiver's removal. To facilitate this action, a bail 38, pivotally mounted on the slide 26, is provided. In so doing, the fingers 29 engages the ramped surfaces 36, which causes the latching lever arms 27 to pivot inwardly, thereby disengaging the latch hooks 36 from the guide rail or cage (FIG. 3).

A rectangular flap 41 is bent from the sheet 31 and positioned between the ROSA 3 and the TOSA 4 forming a divide shield to limit crosstalk therebetween. Additional flaps, bent upwardly from the sheet 31 for contacting the ROSA 3 and the TOSA 4, may be provided for grounding the ROSA 3 and the TOSA 4 to the housing 2, i.e. to the base 7 and/or the cover 8. Alternatively, a separate divider shield 45 can be positioned between the ROSA 3 and the TOSA 4 to provide the same protection. As illustrated in FIG. 3, the divider shield 45 includes OSA flaps 46a and 46b for contacting the tops of the ROSA 3 and the TOSA 4, respectively. Coupler flaps 47a and 47b are spring biased outwardly from the side of the shield 45 for contacting, i.e. grounding, the ROSA optical coupler and the TOSA optical coupler found in the snout 14. Grounding flaps 48a and 48b are biased upwardly from the shield 45 for contacting the inside of the heat dissipating cover 8, thereby providing a grounding path between the base 7 and the cover 8.

Spring claws 42 extend forwardly from the sheet 31 through slots 43 in the snout 14 into engagement with the slide 26 for locking the slide 26 in the latched position when an optical connector is present in the optical coupler, i.e. snout 14. Rectangular recesses 44 in the slide 26 align with the slots 43 when in the latched position for receiving the curved outer free ends of the spring claws 42. If an optical connector is not positioned in the snout 14, then the relative movement between the slide 26 and the snout 14 lifts the ends of the spring claws 42 up out of engagement with the recesses 44. However, if an optical connector is inserted into the snout 14, then the presence of the optical connector forces the ends of the spring claws 42 into the recesses 44 and prevents them from becoming disengaged.

Figure 5:
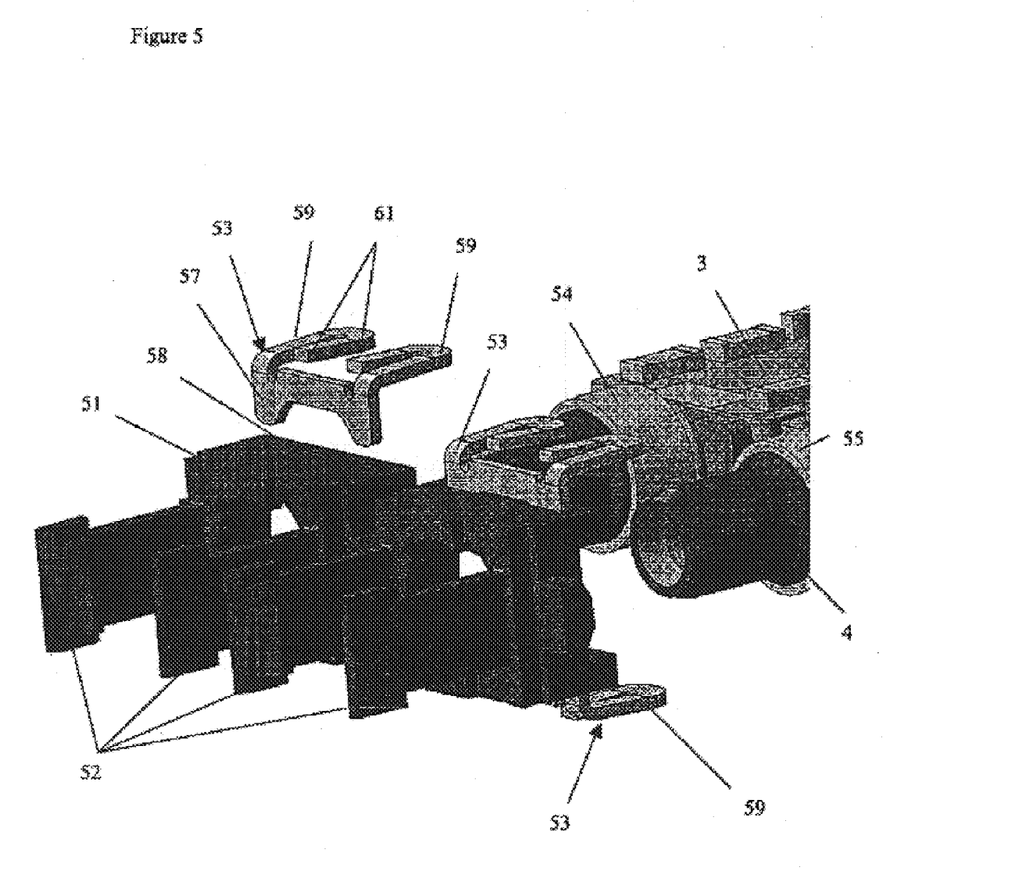
FIG. 5 is a partially exploded view of internal elements of the front end of the transceiver of FIG. 1.

With particular reference to FIG. 5, a dual SC connector clip 51, preferably nickel plated, is provided to facilitate alignment and proper spacing of the optical connectors with the ROSA 3 and the TOSA 4. The SC connector clip 51 includes a pair of cantilevered spring arms 52 for each of the two optical connectors that are optically coupled to the transceiver 1, as is well known in the art. Spring tabs 53, also made from or including a conductive material, are used to mount the SC connector clip 51 to bores 54 and 55 of the ROSA 3 and the TOSA 4, respectively. One end 57 of each spring tab 53 is inserted into a slot 58 in the SC connector clip 51 Each spring tab 53 also includes a pair of U-shaped resilient arms 59, with the free ends 61 thereof biased outwardly for contacting the cover 8 or the base 7. With this arrangement, the spring tabs 53 ground the ROSA 3 and the TOSA 4 to the SC Connector clip 51, and also provide a grounding path from those two elements to the base 7 and the cover 8. The positioning of the resilient arms 59 in contact with the bores 54 and 55 is particularly advantageous for grounding the ends of the ROSA 3 and the TOSA 4, which extend into a cavity formed by the snout 14. The spring tabs 53 also close off the space above and below the ROSA 3 and the TOSA 4 to limit the passage of electromagnetic interference between the transceiver housing 2 and outside thereof.

Figure 6A:
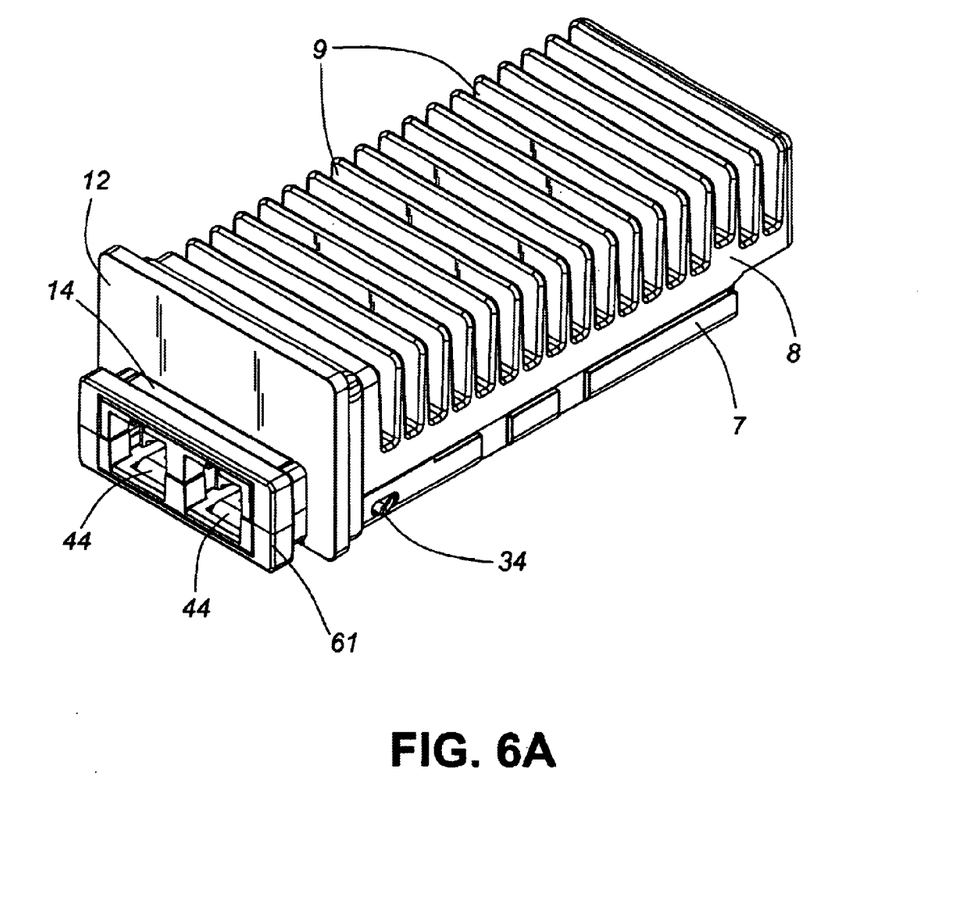
FIG. 6a is an isometric view of an opto-electronic transceiver according to a second embodiment of the present invention.
Figure 6B:
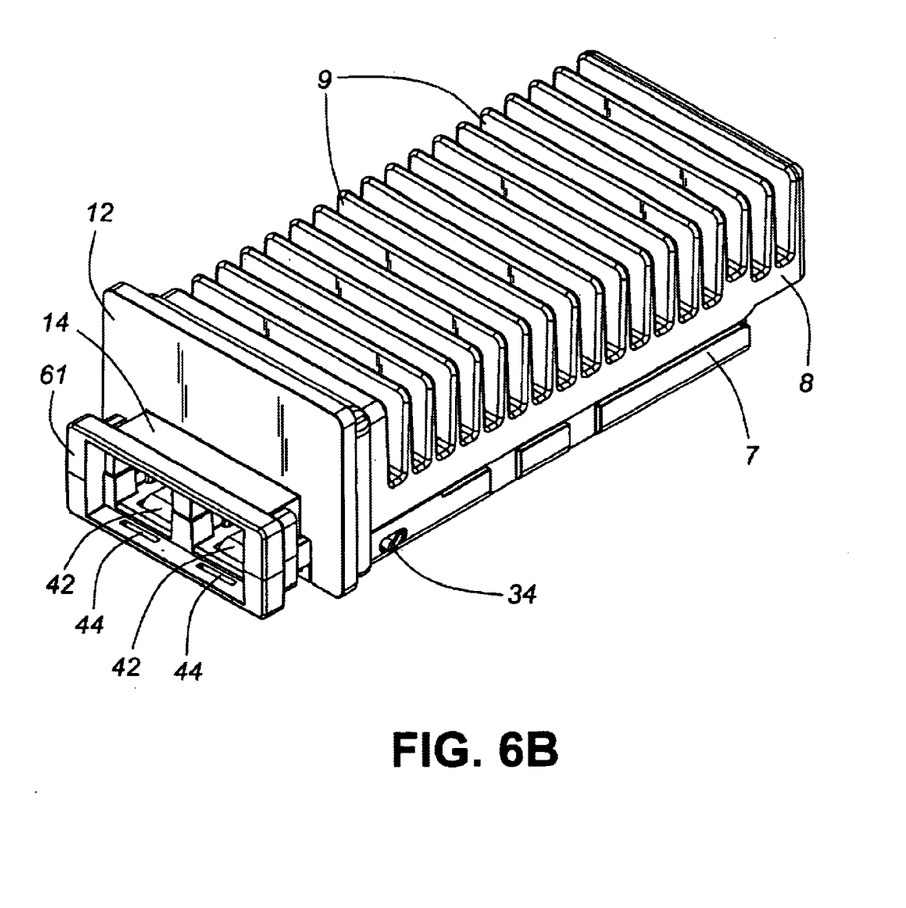
FIG. 6b is an isometric view of the transceiver of FIG. 6a with the latch in the unlatched position.

FIGS. 6a and 6b illustrate an alternative embodiment of the present invention in which the bail 38 is replaced by a rectangular shoulder 61, which extends outwardly from around the slide 26, preferably from around all four sides of the slide 26, but any two opposing sides would also be useful. FIG. 6a illustrates the slide 26 in the latched position, while FIG. 6b illustrates the slide 26 in the unlatched position. During unlatching the user applies a forces behind the shoulder 61, in the removal direction, that initially disengages the latch hook 34 and subsequently overcomes the friction force between the electrical connector 6 and the electrical coupler to pull the transceiver 1 out of the host device.

Figure 7:
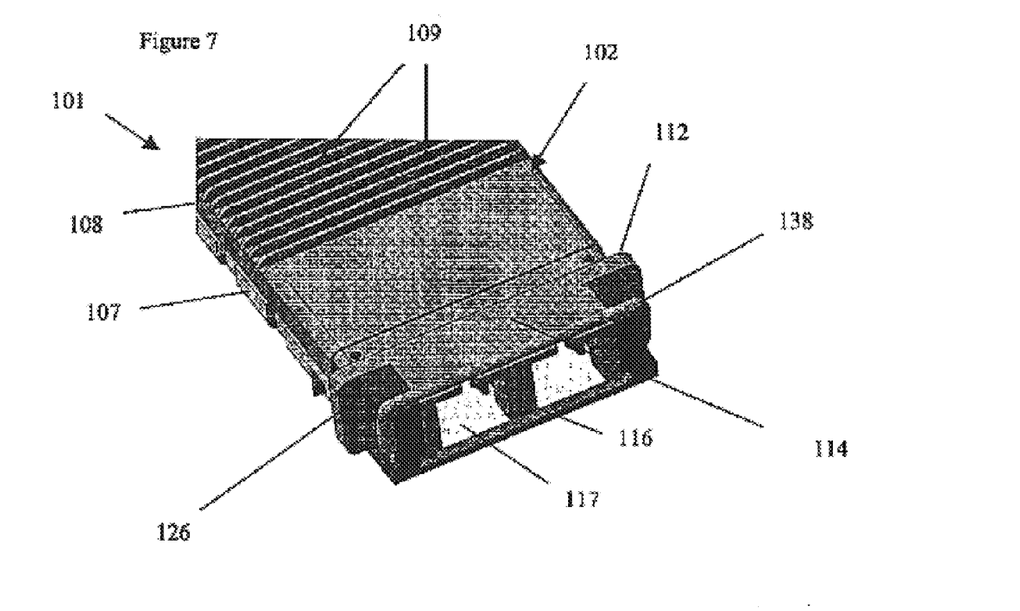
FIG. 7 is an isometric view of an opto-electronic transceiver according to a third embodiment of the present invention.
Figure 8:
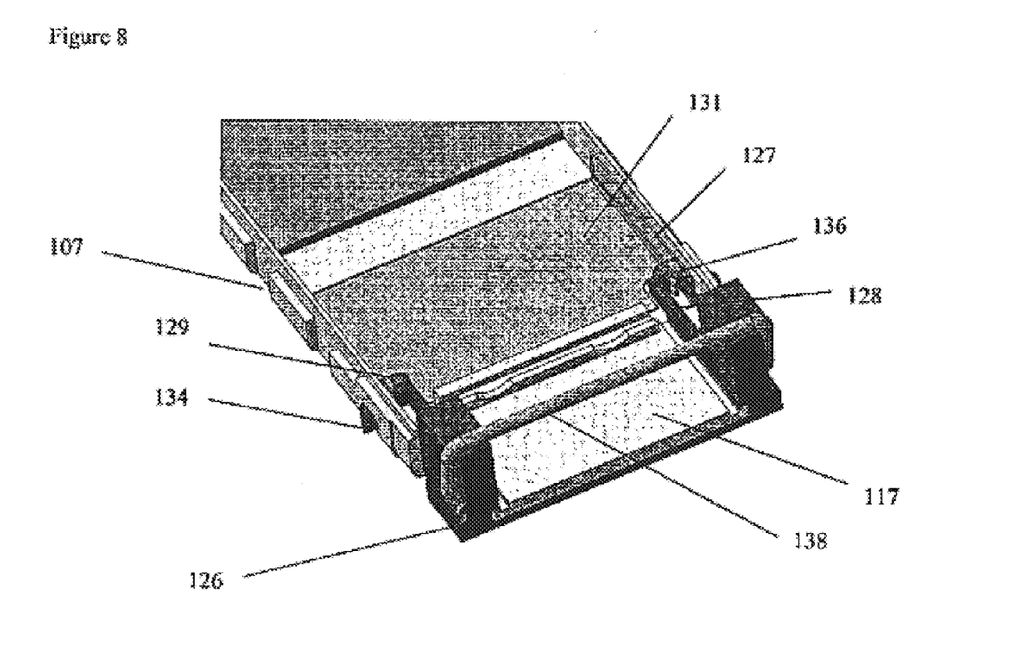
FIG. 8 is an isometric view of the transceiver of FIG. 7 with the cover removed to illustrate the latching device.

FIGS. 7 and 8 illustrate another embodiment of the present invention in which a transceiver 101 includes a housing 102 defined by a base 107 and a heat dissipating cover 108. Fins 109 extend from the heat dissipating cover 108 for increasing the surface area of thereof, i.e. increasing the amount of heat dissipation. A flange 112 extends outwardly from the sides of the housing 102 providing a hard stop and an EMI shield for the transceiver 101 upon insertion into a corresponding guide rail or cage of a host device. A snout 114 extending from the flange 112 includes a top portion 116, provided from the cover 108, and a bottom portion 117, provided from the base 107. A slide 126 includes grooves in either side thereof for receiving opposing edges of the bottom portion 116, thereby defining a slideable engagement. Arms 128 extend rearwardly from the slide 126, with fingers 129 extending upwardly therefrom (as opposed to fingers 29, which extend downwardly). A sheet of flexible metal 131 extends from one side of the base 107 to the other, and includes two latching lever arms 127 bent upwardly therefrom. Each latching lever arm 127 includes a latch hook 134 and a ramped camming surface 136 for engaging the fingers 129. A bail 138 is provided to facilitate manual grasping and actuation of the slide 126.

Figure 9:
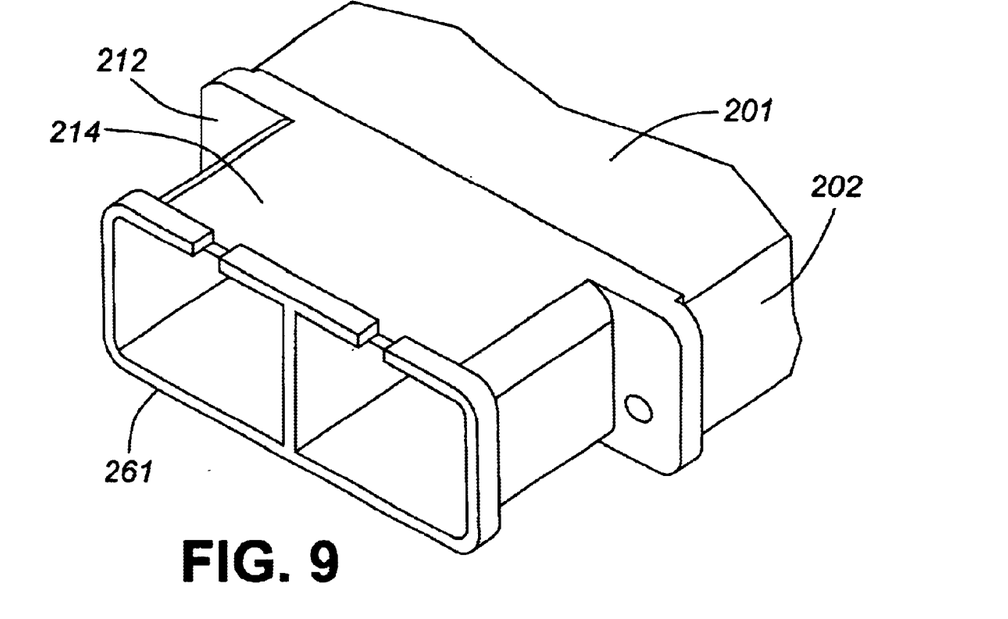
FIG. 9 is an isometric view of an opto-electronic transceiver according to a fourth embodiment of the present intention.
Figure 10:
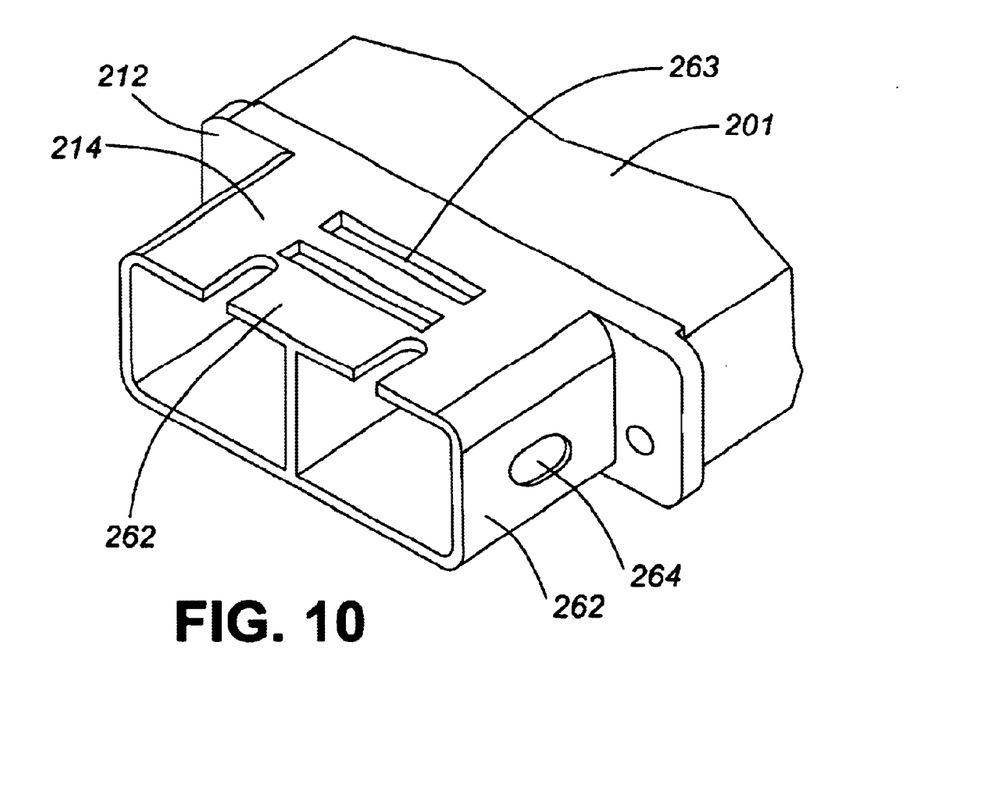
FIG. 10 is an isometric view of an opto-electronic transceiver according to a fifth embodiment of the present intention.
Figure 11:
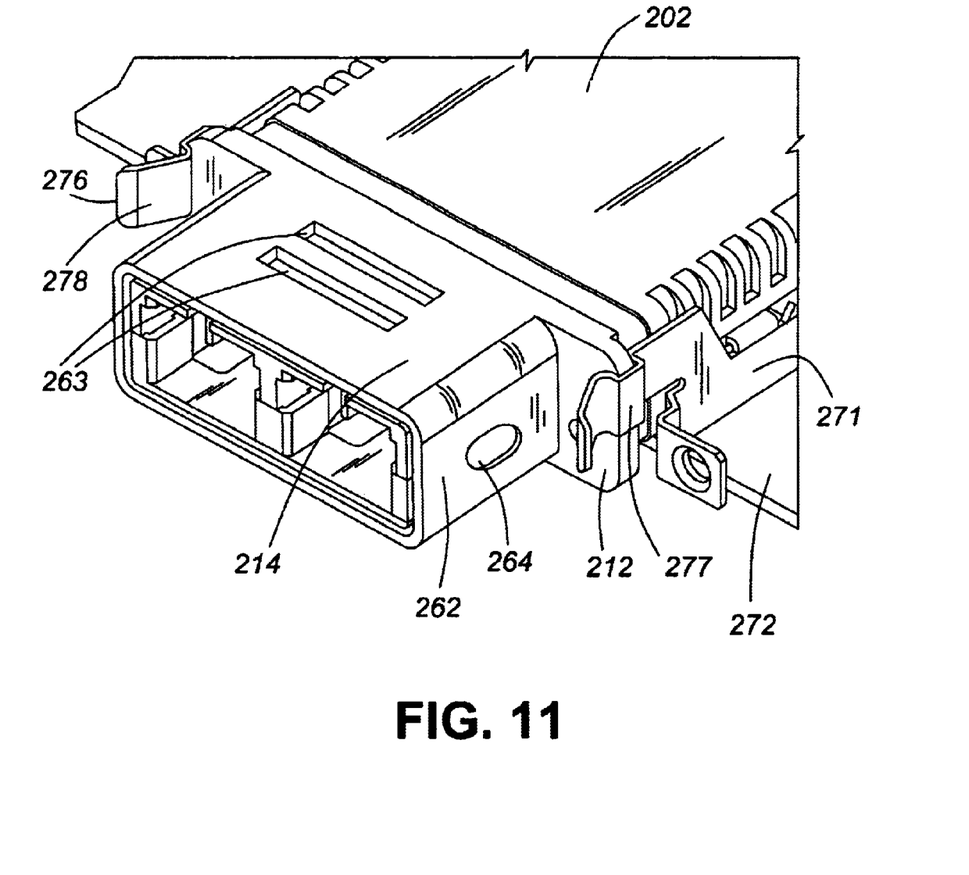
FIG. 11 is an isometric view of an opto-electronic transceiver according to a sixth embodiment of the present invention.

The simplest embodiments of the present invention are illustrated in FIGS. 9, 10 and 11 in which transceivers 201 include a housing 202 for supporting a ROSA, a TOSA, a printed circuit board and all the other standard elements listed above, which are provided in a conventional transceiver. As above, a flange 212 is provided to provide a stop for the transceiver 201 and to block the passage of EMI. Optical coupling is provided via a snout 214 extending from and through the flange 212. The transceivers 201 are held in a cage or rail system 271 (FIG. 11) mounted on a printed circuit board 272 of a host device simply by the friction force between the electrical connector on the transceiver and the electrical coupler on the cage or rail system. Alternatively, additional latches 276 extending from the rail 271 or mounted on a faceplate of the host device, may be provided to latch onto the flange 212. The latches 276 are bent forming channels 277 sized to fit the edges of the flange 212. The ends of the latches 276 are bent outwardly providing an abutment surface 278 enabling the action of inserting the transceiver 201 force the latches 276 apart so that the edges of the flanges 212 can fit into the channels 277. To facilitate removal of the transceiver 201, a gripping shoulder 261, extending from around the snout 214, is provided to enable the transceiver 201 to be grasped and pulled out of the cage or rail system. In an alternative embodiment, illustrated in FIGS. 10 and 11, a gripping shoulder 262 is defined by inner walls of shallow indentations in the sides of the snout 214. Preferably, the indentations take the form of a series of elongated rectangular indentations 263 and/or an oval shaped indentation 264; however, any geometric shape will suffice.

We claim:

1. An optical transceiver module for insertion into an electrical coupler mounted in a guide rail or cage of a host device comprising:
   a first optical sub-assembly for converting optical signals into electrical signals or electrical signals into optical signals;
   a printed circuit board electrically connected to the optical sub-assembly including circuitry for controlling the optical sub-assembly;
   a housing for supporting the optical sub-assembly and the printed circuit board therein;
   an electrical connector extending from a first end of the housing electrically connected to the printed circuit board for mating with the electrical coupler mounted in the host device;
   an optical coupler extending outwardly from the second end of the housing for receiving an optical connector on the end of an optical fiber;
   a reciprocating slide extending at least partially around the optical coupler reciprocatable between a latch position and an unlatch position;
   a first arm extending from the slide into the housing;
   a first lever pivotally mounted to the housing;
   a first latch hook extending outwardly from the first lever for contacting a first latching surface on the guide rail or cage for locking the module in position; and
   a first camming surface on the first lever for engaging the first arm when the slide is slid to the unlatch position, thereby pivoting the first latch hook out of engagement with the first latching surface enabling removal of the module from the host device.

2. The module according to claim 1, further comprising a first finger extending outwardly from the first arm for engaging the first camming surface;
   wherein the camming surface includes an ramped surface at an angle to the first lever;
   whereby reciprocation of the slide away from the module into the unlatched position causes the first finger to engage the ramped surface, thereby pivoting the latch hook out of engagement with the latching surface.

3. The module according to claim 1, further comprising:
   a second arm extending from the slide into the housing along one side thereof;

a second lever pivotally mounted in the housing;

a second latch hook extending outwardly from the second lever for contacting a second latching surface on the guide rail or case for locking the module in position; and a second camming surface on the second lever for engaging the second arm when the slide is in the unlatch position, thereby pivoting the second latch hook out of engagement with the second latching surface enabling removal of the module from the host device.

4. The module according to claim 3, wherein the first and second levers are resiliently biased outwardly, whereby the first and second latch hooks extend outwardly for engagement with the first and second latching surfaces, respectively, unless the slide is in the unlatch position.

5. The module according to claim 4, wherein the first and second levers comprise first and second leaf springs.

6. The module according to claim 5, wherein the first and second leaf springs extend from a single base, which extends from one side of the module to the other.

7. The module according to claim 6, further comprising a second optical sub-assembly for converting optical signals into electrical signals or electrical signals into optical signals; wherein the base also includes a divider shield extending therefrom between the first and second optical subassemblies to lessen crosstalk therebetween.

8. The module according to claim 7, wherein the base also includes spring claws extending therefrom into engagement with said slide when said optical connector is inserted into said optical coupler, thereby preventing movement of said slide to the unlatched position while the optical coupler is connected with said optical connector.

9. The module according, to claim 1, further comprising a locking claw disposed inside said optical coupler and extending through a hole in the optical coupler into contact with said slide, whereby, when said slide is in the latched position and said optical connector is inserted into said optical coupler, said locking claw prevents said slide from reciprocating to the unlatched position until said optical connector is removed.

10. The module according to claim 9, wherein said slide includes a recess, which is aligned with the hole in the optical coupler when the slide is in the latched position, for receiving an end of said locking claw.

11. The module according to claim 3, further comprising a bail pivotally connected at each end thereof to the slide to facilitate reciprocation thereof.

12. The module according to claim 3, further comprising a shoulder extending outwardly from opposite sides of the slide for manually grasping the slide to facilitate reciprocation thereof.

13. The module according to claim 1, further comprising a flange extending outwardly from around the second end of the housing for abutting a front bezel of the host device; and a gasket extending around the housing between the flange and the front bezel for decreasing the amount of electro-magnetic interference escaping the module.

14. An optical transceiver module insertable along an insertion direction into an electrical coupler of a cage or rail system in a host device, which includes a front bezel, comprising:

a transmission optical sub-assembly for converting electrical signals into optical signals;

a receiver optical sub-assembly for converting optical signals into electrical signals;

a printed circuit board electrically connected to the transmission and receiver optical sub-assemblies including circuitry for controlling the transmission and receiver optical sub-assemblies;

a housing for supporting the transmission and receiver optical sub-assemblies and the printed circuit board therein;

an electrical connector extending from a first end of the housing electrically connected to the printed circuit board for mating with the electrical coupler mounted in the host device;

a flange extending outwardly from around a second end of the housing for abutting the front bezel of the host device, said flange defining a first frontal area;

a duplex optical coupler extending outwardly from the second end of the housing for receiving a pair of optical connectors on the ends of a pair of optical fibers, said optical coupler defining a second frontal area, which is less than said first frontal area; and a shoulder extending from opposite sides of the optical coupler for manually gripping the module to facilitate removal thereof from the host device.

15. The module according to claim 14, further comprising:

a reciprocating slide extending at least partially around the optical coupler moveable in the insertion direction between a latched position and an unlatched position, wherein the shoulder extends from opposite sides of the slide;

a first arm extending from the slide into the housing;

a first lever pivotally mounted in the housing pivotable by engagement with the first arm into the latched or unlatched position; and a first latch hook mounted on the first lever for engaging a latching surface on the cage or rail system when in the latched position.

16. The module according to claim 14, further comprising a conductive cross-talk shield disposed between the transmission optical sub-assembly and the receiver optical sub-assembly extending from a base of the housing to a cover of the housing for limiting the amount of cross-talk therebetween, said cross-talk shield including first flaps for contacting the transmission and receiver optical sub-assemblies; and second flaps for contacting the optical coupler, thereby grounding the optical coupler to the housing.

17. The module according to claim 14, further comprising:

a spring clip mounted in the optical coupler for connecting the optical connector to the optical subassembly;

a plurality of spring tabs extending from the spring clips for mounting the spring clips relative to the optical subassembly.

18. The module according to claim 17, wherein the spring clip is comprised of a conductive material; and wherein the spring tabs are comprised of a conductive material for grounding the optical subassembly to the spring clip.

19. The module according to claim 18, wherein the housing is comprised of a conductive material; and wherein the spring tabs include a resilient portion biased into contact with said housing for grounding the spring clip and the spring tabs to the housing.

20. The module according to claim 19, wherein the spring tabs are disposed on opposite sides of the spring clips for closing off apertures above and below the optical subassembly to reduce the amount of electromagnetic interference escaping from the module.

* * * * *